United States Patent [19]

Gilbert

[11] 4,184,073
[45] Jan. 15, 1980

[54] FAST RESPONSE ELECTRON SPECTROMETER

[75] Inventor: Raine M. Gilbert, Centreville, Va.

[73] Assignee: The United States of America as represented by the Secretary of the Army, Washington, D.C.

[21] Appl. No.: 909,412

[22] Filed: May 25, 1978

[51] Int. Cl.² .......................................... H01J 39/00
[52] U.S. Cl. ................................................. 250/305
[58] Field of Search ........ 250/305, 306, 310, 396 ML, 250/397; 313/361, 433

[56] References Cited

U.S. PATENT DOCUMENTS 2,442,848  6/1948  Gardner ............................... 250/305

FOREIGN PATENT DOCUMENTS 475686  6/1975  U.S.S.R. ................................. 250/305

OTHER PUBLICATIONS

"Measurements of the Energy Spectrum of High-Current Electron Beams," Krastelev et al., Pribory i Tekhnika E'Ksperimenta, No. 3, pp. 39-41, May-Jun. 1976.
"Spectrometer for a Pulsed Electron Beam," Gerasimov et al., Pribory i Tekhnika E'Ksperimenta, no. 3, pp. 31-34, May-Jun. 1971.

Primary Examiner—Bruce C. Anderson
Attorney, Agent, or Firm—Nathan Edelberg; Robert P. Gibson; Saul Elbaum

[57] ABSTRACT

An electron spectrometer having a wide bandwidth and a high signal-to-noise ratio. Each electron channel sensor is the termination of a 50-ohm transmission line thereby eliminating series inductance and minimizing parallel capacitance, and resulting in increased bandwidths. A metallic grounding screen is provided between the sensor array and the curving chamber of the spectrometer, thereby completely isolating the sensors from the electromagnetic fields in the curving chamber, and resulting in an increased signal-to-noise ratio.

4 Claims, 4 Drawing Figures ated by the patent laws of the United States.

FAST RESPONSE ELECTRON SPECTROMETER

RIGHTS OF THE GOVERNMENT

The invention described herein may be manufactured, used, and licensed by or for the United States Government for governmental purposes without the payment to us of any royalty thereon.

The present invention is directed to an improved electron spectrometer having a wide bandwidth and a relatively high signal-to-noise ratio, which characteristics make said spectrometer suitable for fast-pulse applications.

As is known, an electron spectrometer is an apparatus for measuring the energies of electrons in an electron beam. Such a spectrometer is ordinarily comprised of a magnetic curving chamber to which incoming electrons are directed, and an electron sensor array. In the curving chamber, a uniform magnetic field causes the electrons to travel in arcs having respective dimensions which correspond to the respective energies of the electrons; the greater the energy of the electrons, the larger the arc. The sensors are disposed in a straight line, and after having been curved by 180° from the entrance direction, the electrons impinge on the sensors, with electrons of different energies impinging on different sensors.

When measuring slow electron pulses or time-invariant electron fluxes, the bandwidth of the spectrometer is relatively unimportant. However, in certain applications it is desired to measure electron energies for electrons delivered in pulses which start and stop in a matter of nanoseconds, and for such applications, a very wide spectrometer bandwidth must be attained. Prior art magnetic spectrometers have not attained the requisite bandwidth, and the reason for this is that the sensors of the prior art devices had relatively large parallel capacitances and series inductances associated with them.

Further, the space electrons which must be sensed by the sensors constitute only a very small electron current. Conversely, the electromagnetic fields associated with the fast-pulse delivery of said electrons are large. Hence, it is important for the signal-to-noise ratio of the spectrometer to be as high as possible. In prior art spectrometers the electromagnetic field generated by electrons moving in the curving chamber frequently induced in the sensors conduction currents that tended to obscure the space electron current which it is necessary for the sensors to detect.

It is therefore an object of the invention to provide an electron spectrometer having a very high bandwidth.

It is a further object of the invention to provide an electron spectrometer having a high signal-to-noise ratio.

The above objects are accomplished by making each sensor the termination of a 50-ohm transmission line. Since the sensor is simply the cross-sectional area of the transmission-line center conductor, parallel capacitance is minimized, and since no series connecting wires are used, series inductance is eliminated. Accordingly, the bandwidth of the device is substantially wider than has been achieved in the prior art. Further, a grounded metallic screen is provided between the sensor array and the curving chamber, and the screen electromagnetically isolates the sensors from the electromagnetic fields present in the curving chamber during the pulse, and significantly increases the signal-to-noise ratio of the device.

The invention will be better understood by referring to the accompanying drawings in which.

Figure 1:
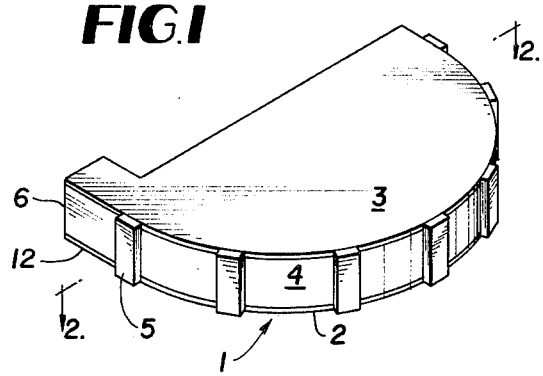
FIG. 1 is a perspective view of the exterior of the electron spectrometer of the invention.

Referring to FIG. 1, it is seen that the electron spectrometer is comprised of two metallic half-circular, highly-permeable discs 2 and 3, which are separated by metallic non-permeable arcuate sheet 4. A plurality of permanent bar magnets, 5, are disposed as illustrated, around the periphery of arcuate sheet 4, and collimater 12 extends linearly from the spectrometer. In the preferred embodiment the highly-permeable half-discs are made of steel, the arcuate strip is aluminum, and the discs are separated by 0.372".

Figure 2:
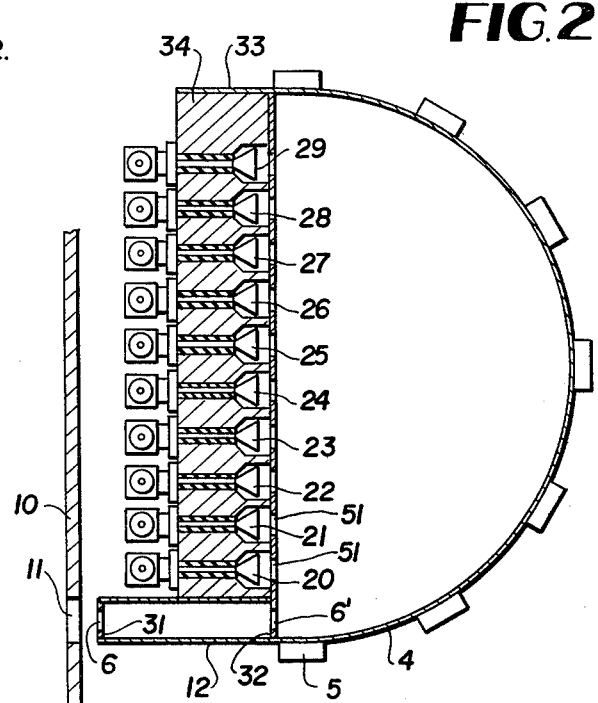
FIG. 2 is a sectional view of the electron spectrometer of the invention taken on lines 2—2 of FIG. 1.

An illustration of the interior of the electron spectrometer is shown in FIG. 2, and it can be seen that collimator 12 includes two parallel plates, 31 and 32, having respective parallel circular openings 6 and 6' therein. Although not shown in FIG. 2, collimator 12 is lined with a mu-metal shield for shielding the drift-space in the collimator from the magnetic field applied to the curving chamber. Electron sensors 20–29 are disposed inside the half-disc structure as shown and approximately linear portion 33 extends from the half-discs. Beam forming plate 10 having circular aperture 11 for forming an electron beam is disposed to one side of collimator 12. This plate is not an integral or necessary part of the invention.

In the typical operation of the electron spectrometer, a source of electrons, the energies of which it is desired to measure, is located to the left of the beam forming plate 10. The electrons are impinged on plate 10 and a beam of electrons is passed through aperture 11, and then through opening 6 and 6" of collimator 12. The bar magnets 5 cause a uniform magnetic field to be present in the curving chamber, including the space where the electrons exit from the collimator and enter the chamber. In FIG. 2 the magnetic field is perpendicular to the plane of the paper and since the direction of the velocity of the electrons is perpendicular to the plane of plates 31 and 32, according to the vector relationship $\vec{F}=e\vec{v}\times\vec{B}$, a force is directed on the electrons perpendicular to their direction of travel, causing them to move in a circular path. The radius of diameter of the circular path is proportional to the initial velocity of the electrons. Since electron energy increases with increasing velocity, the most energetic electrons travel in the longest arcs and are incident upon the furthest electron sensors (e.g. 29), while the least energetic electrons travel in the smallest arcs and are incident upon the nearest electron sensors (e.g. 20). Similarly, electrons of intermediate energies are incident upon the intermediate electron sensors 21–28. It should be understood that while ten electron sensors are shown in FIG. 2, any desired number may be utilized, depending upon the energy range and resolution desired.

The electron spectrometer of the invention can be used either to measure an electron beam in which nominally all of the electrons are at the same energy, but where this common energy changes with time, or can be used to measure the energy distribution of electrons within a beam which consists of electrons simultaneously at different energies. Additionally, it can be used to measure pulses of low current densities if followed by a wide bandwidth pulse amplifier.

As mentioned above, one of the problems with prior art electron spectrometers has been their relatively slow response time (and attendent low bandwidth) and consequently inability to suitably measure very fast electron pulses, for instance pulses which start and stop within a period of several nanoseconds. Additionally, this slow response time becomes an even more serious limitation when the electron beam injected into the spectrometer has a very narrow energy spectrum that is changing rapidly during the pulse. In this circumstance, the electron beam excites a given sensor only for that fraction of the pulse width that the beam energy matches that of the sensor. Hence, in this application, it follows that the sensor response time must be significantly shorter than the electron beam pulse width. In the prior art, a rectangular plate electron collector formed from printed-circuit board, which includes two copper surfaces separated by a dielectric typically was used. The copper plates, one acting as the collector and the other as a ground plane, were connected to a 50 ohm transmission line by metal rods, wires or peripheral metal surface contacts. The nearness of the two parallel copper surfaces to each other resulted in a large shunt capacitance to ground which decreased the bandwidth of the sensor, while the means of connecting the electron collector and its ground plane to the transmission line resulted in a series inductance which also decreased the bandwidth. As described below, according to the sensor configuration of the present invention, the parallel capacitance is significantly reduced and the series inductance is eliminated, which results in a large increase in bandwidth.

Figure 3:
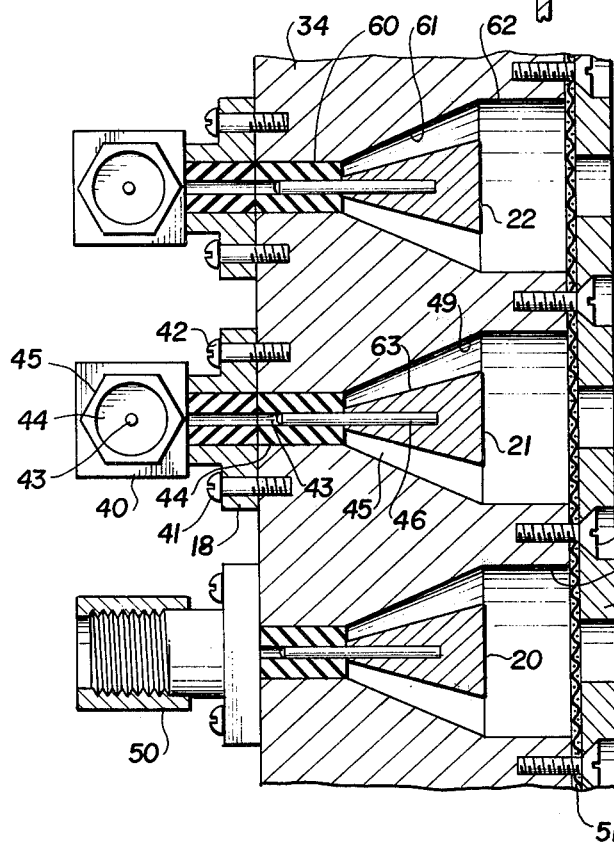
FIG. 3 is a detailed illustration of the electron sensor array and screen of the electron spectrometer of the invention.

This is achieved by making each of the electron sensors be the open-ended termination of a 50 ohm transmission line, which is preferably but not necessarily of conical geometry. The conical transmission line segment is designed to increase the center conductor diameter from connector size to the desired sensor diameter. For instance, referring to FIG. 3, surfaces 20, 21 and 22, which are the open-ended terminations of their respective conical transmission lines, act as electron collectors and are the electron sensors. Hence, close proximity of this collecting surface to grounded surfaces is minimized, thereby reducing the shunt capacitance, and no connecting rods, peripheral surfaces or wires need be utilized to join the sensor to the transmission line, thereby eliminating the series inductance typically encountered in prior art spectrometers.

Each of the sensors 20, 21 and 22 (and each of the others not shown) is set in brass block 34 which is drilled with a plurality of openings, one for each sensor. Referring to the top opening in FIG. 3, it can be seen that the openings consist of relatively narrow circular portion 60, an intermediate conical portion 61, and a relatively wide circular portion 62. A 50 ohm connector is inserted in the relatively narrow opening such as connector 40 having center conductor 43, insulating polystyrene sleeve 44, and outer conductor 45. The connector is connected to brass block 34 by four metal screws, of which two, 41 and 42, are shown in the FIGURE and the outer conductor 45 is electrically connected to the block by the flush mounting and the four mounting screws. If an SMA connector is utilized, then center conductor 43 is rigid, and the conductor is extended beyond the insulation of 46, where solid aluminum cone-shaped element 63 is secured to it. If a connector is used in which the center conductor is not sufficiently rigid to support the cone-shaped element 63, the center conductor can be extended by attachment to a rigid metallic conducting rod. Thus a 50 ohm conical transmission line is formed by cone-shaped element 63 and the surface 49 of the conical opening 61. Note that the two conical surfaces start and end together as shown in the detailed view of FIG. 3, FIG. 2 being only an approximate representation. Thus, the internal surfaces to the left of the electron sensing surface in FIG. 3 form the 50 ohm transmission line, wherein exists no stray shunt capacitance to ground or series inductance.

Fifty-ohm connectors are standard items of hardware, and for instance may be SMA bulkhead connectors. While connector 40 is of the right angle variety, a straight connector is an alternative, and a straight connector 50 is illustrated below connector 40 in FIG. 3.

Figure 4:
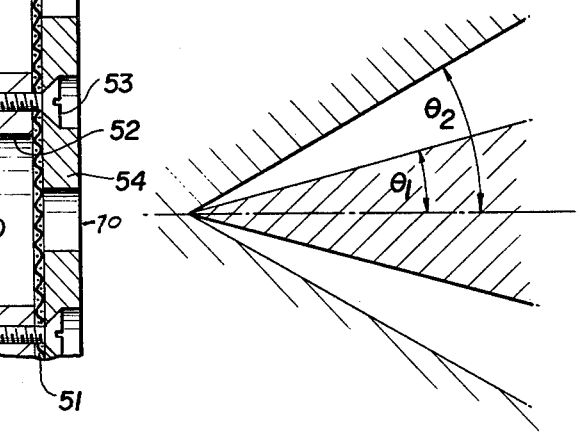
FIG. 4 is a diagram which is useful in explaining how the conical transmission line impedance of the sensor configuration is determined.

FIG. 4 is a diagram which is useful in determining the angles of the two conical surfaces which make up the conical transmission line. Referring to the FIGURE, the transmission line impedance 20 is determined according to the expression:

$$Z_o = \frac{2}{2\pi} \ln\left(\frac{\cot\frac{\theta_1}{2}}{\cot\frac{\theta_2}{2}}\right)$$

$$= 60 \ln\left(\frac{\cot\frac{\theta_1}{2}}{\cot\frac{\theta_2}{2}}\right) \text{ in air or vacuum.}$$

A mentioned above, electron spectrometers of the prior art have not possessed sufficiently high signal-to-noise ratios. Thus, the space electron current to be measured by the electron sensors may be of a relatively low magnitude, and this current may become obscured by the conduction currents induced by the electromagnetic fields generated by the electrons which are traveling in the curving chamber. The present invention obviates this problem by providing a grounded metallic screen 51 between the sensor array and the curving chamber. The screen may be comprised of metallic wires running at right angles to each other, and the rectangular openings are made small enough to completely isolate the electromagnetic fields yet still pass the major part of the electron beam. The screen 51 is attached to the interior face of brass block 34 by screws 53. Aluminum plate 54 having holes 70 of appropriate diameter is held flush to the screen by screws 53. An appropriate diameter is one which is as large as possible without exceeding that needed to insure sensor collection of the substantial majority of electrons admitted to the channel. Aluminum plate 54 may be rectangular and extends in length from the edge of the collimator to beyond the highest-energy channel aperture 29, and in height from one interior half-disc surface to the other. While only one mounting screw 53 is seen between adjacent holes in the view of FIG. 3, in the actual embodiment, two screws are used, one near each respective half-disc.

I wish it to be understood that I do not desire to be limited to the exact details of construction shown and described, for obvious modification can be made by a person skilled in the art.

What is claimed is:

1. An electron spectrometer having a relatively high signal-to-noise ratio comprising, magnetic curving chamber means for causing electrons inputted thereto to travel in arcs having respective dimensions corresponding to the respective energies of said electrons, a plurality of electron sensing means disposed in a row for receiving said electrons after being curved in said arcs, and, a plate and a screen, both of which separate said sensing means from said curving chamber, the plate having a plurality of apertures therein, each aperture being directly in front of and providing access to a respective sensing means, and the screen comprising a conducting grounding screen having openings substantially smaller than said apertures wherein said electron sensing means is the termination of a transmission line.

2. The electron spectrometer of claim 1 wherein said transmission line is a 50 ohm transmission line.

3. The electron spectrometer of claim 1 wherein such said electron sensing means is a plane metallic surface and wherein said screen is disposed parallel to but separated from said surface.

4. The electron spectrometer of claim 3 wherein said transmission line is a 50 ohm conical transmission line.

* * * * *